US008669744B1

(12) United States Patent
Vinciarelli

(10) Patent No.: US 8,669,744 B1
(45) Date of Patent: Mar. 11, 2014

(54) ADAPTIVE CONTROL OF SWITCHING LOSSES IN POWER CONVERTERS

(75) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 236 days.

(21) Appl. No.: 13/027,830

(22) Filed: Feb. 15, 2011

(51) Int. Cl.
*G05F 1/10* (2006.01)
*G05F 1/24* (2006.01)

(52) U.S. Cl.
USPC .......................................... 323/235; 323/259

(58) Field of Classification Search
USPC ............ 323/220, 222, 235, 282, 259; 363/39, 363/53, 59, 60
See application file for complete search history.

(56) References Cited

U.S. PATENT DOCUMENTS

| 5,668,466 | A | * | 9/1997 | Vinciarelli et al. | 323/282 |
|---|---|---|---|---|---|
| 6,522,108 | B2 | * | 2/2003 | Prager et al. | 323/222 |
| 6,788,033 | B2 | | 9/2004 | Vinciarelli | 323/225 |
| 7,154,250 | B2 | | 12/2006 | Vinciarelli | 323/240 |
| RE40,072 | E | | 2/2008 | Prager et al. | 323/222 |
| 7,561,446 | B1 | | 7/2009 | Vinciarelli | 363/17 |
| 8,027,179 | B2 | * | 9/2011 | Hallak | 363/98 |
| 2005/0017699 | A1 | * | 1/2005 | Stanley | 323/282 |
| 2007/0109822 | A1 | | 5/2007 | Kuan | 363/21.14 |
| 2008/0130326 | A1 | | 6/2008 | Kuan | 363/21.14 |
| 2012/0026754 | A1 | * | 2/2012 | Ye | 363/17 |

OTHER PUBLICATIONS

Stratakos, Anthony J., et al., "A Low-Voltage CMOS DC-DC Converter for a Portable Battery-Operated System," Power Electronics Specialists Conference, PESC '94 Record., 25th Annual IEEE, Jun. 20-25, 1994, vol. 1, pp. 619-626.

* cited by examiner

*Primary Examiner* — Adolf Berhane
(74) *Attorney, Agent, or Firm* — Fish & Richardson P.C.

(57) ABSTRACT

A zero voltage switching (ZVS) technique for use in isolated and non-isolated switching power converters and regulators, e.g. based upon buck, boost, buck-boost, and double-clamped topologies is disclosed. During a reverse energy phase of the converter operating cycle, energy is transferred in reverse from the load or the clamp capacitor to the inductor, allowing the current in the inductor to increase in magnitude with a reverse polarity, building up reverse energy. The reverse energy may be used for charging and discharging parasitic and other circuit capacitances for ZVS. The reverse energy phase is adjusted based upon circuit operating conditions, so that the amount of energy stored in the inductor L at the end of the reverse energy phase is approximately equal to, but preferably no greater than, that required to turn the switches ON at substantially zero voltage. Thus full ZVS may be achieved under a wide variety of operating conditions without incurring unnecessary losses. The reverse energy phase may be adjusted on the fly in response to changing operating conditions, e.g. using feedback control, or a look-up table. Alternatively, the reverse energy phase may be factory or field programmed for operation under specific conditions.

37 Claims, 14 Drawing Sheets

ADAPTIVE CONTROL OF SWITCHING LOSSES IN POWER CONVERTERS

BACKGROUND

This invention relates to reducing switching losses in switching power supplies.

There are many known DC-DC pulse-width-modulated ("PWM") converter topologies. For example, FIGS. 1, 2, and 3 show, respectively, a non-isolated buck 10, boost 20, and buck-boost 30 converter. As shown, each converter has an input for receiving power from a unipolar input source, e.g. voltage source, Vin; one or more switches, i.e. switches S1 through S4; and an inductive element, L. In each of the topologies, the converter output voltage, Vo, or the converter output current may be controlled by controlling the timing of the ON and OFF intervals of the switches during each of a series of converter operating cycles. In some embodiments, some of the switches may be replaced by diodes, e.g., switches S2 and S3 in FIGS. 1, 2 and 3 may be replaced by diodes; or the switches may be supplemented by a diode connected across the switch, such as the intrinsic body drain diode of a MOSFET used as a switch.

In a "continuous" mode of operation a PWM converter may be configured and controlled so that, over a range of input voltage and load conditions, the current in the inductive element flows continuously in one direction during each converter operating cycle. Referring to FIG. 4, an idealized waveform of the current, $I_L$, flowing in an inductive element of an idealized buck 10 (or boost 20) converter is shown operating in a continuous mode. (The idealized converters assume no losses, ideal switches, and no parasitic capacitances or inductances.) The operating cycle of the converter is shown having a period, Top. During the time interval T1, switch S1 (S4) is ON and switch S2 (S3) is OFF. During the interval T2, switch S1 (S4) is OFF and switch S2 (S3) is ON. As shown in FIG. 4, the current $I_L$ remains positive and greater than zero throughout the converter operating cycles.

In a non-idealized converter (real switches, parasitic capacitances and inductances, and losses) operating in continuous mode, a delay may be provided after the turning OFF of a first switch (e.g., switch S1, FIG. 1; switch S4, FIG. 2) in order to allow the current, $I_L$, flowing in the inductive element to charge and discharge parasitic and circuit capacitances so that the subsequent turning ON of a second switch (e.g., switch S2, FIG. 1; switch S3, FIG. 2) may occur at a reduced, or at substantially zero, voltage, substantially reducing or eliminating switching losses in the second switch. Because of the unidirectional polarity of the inductive element current, however, it may not be possible to exploit the flow of inductive element current to reduce or eliminate switching loss in the first switch.

In a "discontinuous" mode of operation, a PWM converter may be configured and controlled so that the current, $I_L$, flowing in the inductive element returns to zero or reverses polarity during each converter operating cycle. Referring to FIG. 5, an idealized waveform shows the current, $I_L$, flowing in the inductive element of an idealized (ideal switches, no parasitic capacitances or inductances, and no losses) buck 10 or boost 20 converter (FIGS. 1, 2) operating in discontinuous mode with a converter operating cycle having a period, Top. During the time interval T1, switch S1 (S4) is ON and switch S2 (S3) is OFF. Conversely, during time interval, T2, switch S1 (S4) is OFF and switch S2 (S3) is ON. Both switches are OFF during the time interval T3. As shown in FIG. 5, the current, $I_L$, is positive for a portion of each operating cycle and returns to zero prior to the end of the operating cycle.

Using a switch to retain energy in an inductive element as a means of reducing noise and switching losses in switching power converters is described in Prager et al, Loss and Noise Reduction in Power Converters, U.S. Reissue Pat. No. Re 40,072, assigned to VLT Corp. and incorporated here by reference in its entirety (the "072 Patent"). FIGS. 6 and 7 respectively illustrate a boost converter 100 and a buck converter 110 of the kind described in the 072 Patent. As shown, each converter includes a clamp circuit 102 (including clamp switch 103 and a diode 105) connected across its respective inductive element 104, 106. In operation, the inductor current in each converter declines after the first switch 112, 114 is turned OFF (interval T2, FIG. 5). Non-ideal diodes 108 and 116 continue to conduct for a short time after the inductor current declines to zero at time to (FIG. 5) (e.g. due to non-ideal diode reverse recovery and capacitance characteristics) allowing the inductor current to reverse polarity. As a result, a negative inductor current will be flowing when the diode stops conducting. The clamp switch being ON when the diode ceases conducting, traps the energy (the negative current) in the inductive element (e.g., during the time interval t3, FIG. 5) and when opened a short time prior to turning ON the first switch 112, 114, allows the trapped energy (i.e. the negative inductor current) to charge and discharge the parasitic capacitances, Cp 111, 113, reducing the voltage across the first switch before it is turned ON.

A buck-boost converter incorporating switches to retain energy in an inductive element and control techniques for operating the converter is described in Vinciarelli, Buck-Boost DC-DC Switching Power Conversion, U.S. Pat. Nos. 6,788,033 and 7,154,250, both assigned to VLT Corp. and incorporated here by reference in their entirety (the "ZVS Buck-Boost" patents). An isolated buck-boost converter that includes both an active clamp circuit and a clamp phase, in which all of the power switches in the converter may be switched ON at zero-voltage thereby reducing switching losses is described in Vinciarelli, Double-Clamped ZVS Buck-Boost Power Converter, U.S. Pat. No. 7,561,446 assigned to VLT Corp. and incorporated here by reference in its entirety (the "Double-Clamped Patent").

Controlling switches in a buck or a boost converter until the current in an inductive element reaches a positive upper limit and reverses to a negative lower limit wherein the average output current is controlled and exploiting the flow of reversed current to achieve zero-voltage switching, is disclosed in Kuan, Zero Voltage Switch Method for Synchronous Rectifier and Inverter, U.S. Patent Application 2007/0109822.

SUMMARY

In general, one exemplary aspect features an apparatus for converting power received via an input from an input source at an input voltage for delivery to a load via an output at an output voltage in a series of converter operating cycles includes an inductor for delivering energy from the input source to the output. A first series circuit with first and second terminals may be configured to be connected across either the input or the output. The first series circuit may include a central node for connection to a first end of the inductor. The first series circuit may include a first switch connected between the first terminal and the central node and a second switch connected between the second terminal and the central node. The central node may be characterized by a node capacitance. A controller may be configured to operate the switches in a series of converter operating cycles. During a freewheel phase, a selected one of the first or second switches may be conductive and a current flowing in the inductor may be characterized by a first polarity and a magnitude which begins to decrease. During a reverse energy phase, the selected one of the first or second switches may be conductive and the current flowing in the inductor may be characterized by a second polarity at the end of the reverse energy phase. The second polarity may be opposite of the first polarity. During an energy recycling phase, the first and second switches may be OFF and energy stored in the inductor may be used to charge or discharge the node capacitance. The controller may be configured to adjust the reverse energy phase, and the amount of energy stored in the inductor at the end of the reverse energy phase, as a function of the amount of energy required to charge or discharge the node capacitance during the energy recycling phase.

In general, another exemplary aspect features a method for converting power received from an input source at an input voltage via an inductor for delivery to a load connected to an output at an output voltage. A plurality of switches may be operated in a series of converter operating cycles, including a freewheeling phase during which selected switches are conductive and a current flowing in the inductor may be characterized by a first polarity and a magnitude which begins to decrease. A reverse energy phase may be established during which the selected switches are conductive and the current flowing in the inductor may be characterized by a second polarity (opposite of the first polarity) at the end of the reverse energy phase. An energy recycling phase may be established during which the selected switches are OFF and energy stored in the inductor may be used to charge or discharge a capacitance associated with a node to which the inductor is connected. The reverse energy phase and the amount of energy stored in the inductor at the end of the reverse energy phase may be adjusted as a function of the amount of energy required to charge or discharge the capacitance during the energy recycling phase.

Implementations of the method or apparatus may include one or more of the following features. The end of the reverse energy phase may be delayed to increase the magnitude of the current of the second polarity flowing in the inductor. The duration of the reverse energy phase may be reduced to decrease the magnitude of the current of the second polarity flowing in the inductor. The timing of the end of the reverse energy phase may be adjusted as a function of input voltage, output voltage, or both. An operating parameter may be determined and used to select an indexed value from a table of stored values. The indexed value may be used to set the timing of the end of the reverse energy phase. The operating parameter may be a function of input voltage, output voltage, or both. A closed loop feedback system may be used to adjust the timing of the reverse energy transfer phase. The feedback system may include an input to sense a voltage at the central node. The amount of time between the inductor current changing polarity and the end of the reverse energy phase may be adjusted. A clamp phase may be established during which clamp circuitry is enabled and the current flowing in the inductor is clamped to retain the second polarity. The reverse energy phase may be terminated when the sensed magnitude of current flowing in the inductor reaches a threshold. The threshold may be adjusted as a function of input voltage, output voltage, or both. The adjusting may include using predetermined setting information to program the duration of the reverse energy phase. The adjusting may include sensing operating conditions and making adjustments to the reverse energy phase based upon the sensed operating conditions. The adjusting may include sensing a voltage at the node and adjusting the reverse energy phase as a function of the sensed voltage. The duration of the reverse energy phase may be increased: (i) in a buck converter as the ratio of input voltage to output voltage increases beyond two; (ii) in a boost converter as the ratio of output voltage to input voltage falls below two; (iii) in a buck-boost converter as the ratio of input voltage to output voltage increases beyond one; or (iv) in a double-clamped buck-boost converter as the ratio of input voltage to primary-reflected output voltage increases beyond one. The duration of the reverse energy phase may be minimized: (i) in a buck converter if the ratio of input voltage to output voltage is less than two; (ii) in a boost converter if the ratio of output voltage to input voltage is greater than two; (iii) in a buck-boost converter if the ratio of input voltage to output voltage is less than one; or (iv) in a double-clamped buck-boost converter if the ratio of input voltage to primary-reflected output voltage is less than one.

The first series circuit may be connected across the input, the second end of the inductor may be connected to output, and the power conversion may be from an input voltage that is higher than the output voltage. The second end of the inductor may be connected to the input, the first series circuit may be connected across the output, and the power conversion may be from an input voltage that is lower than the output voltage.

The first series circuit may be connected across the input and a second series circuit with third and fourth terminals may be connected across the output. The second series circuit may include a second central node for connection to the second end of the inductor. The second series circuit may include third and fourth switches each connected between the second central node and the third and fourth terminals, respectively. The second central node may be characterized by a second node capacitance. One of the first or second switches and one of the third or fourth switches may be used to clamp the inductor. Power may be converted from an input voltage that may be less than or greater than the output voltage.

A secondary winding inductively coupled to the inductor may be connected to the output and the first series circuit may be connected across the input. A second series circuit may be connected across a clamp capacitor with a second central node characterized by a second node capacitance connected to a second end of the inductor. The second series circuit may include third and fourth switches connected between the second central node and the third and fourth terminals, respectively. One of the first or second switches and one of the third or fourth switches may be used to clamp the inductor. The power conversion may be via a transformer formed by the inductor and the secondary winding.

DESCRIPTION OF DRAWINGS

We first describe the Figures.

Like reference symbols in the various drawings indicate like elements.

DETAILED DESCRIPTION

Figure 2:
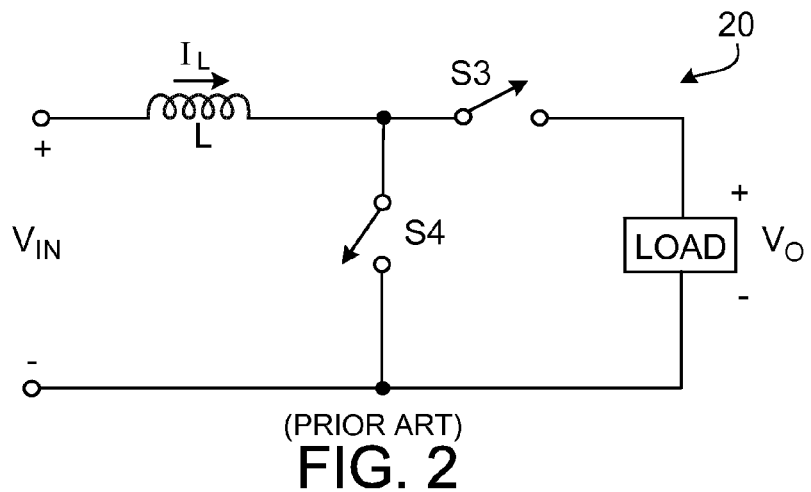
FIG. 2 shows a boost converter topology.
Figure 3:
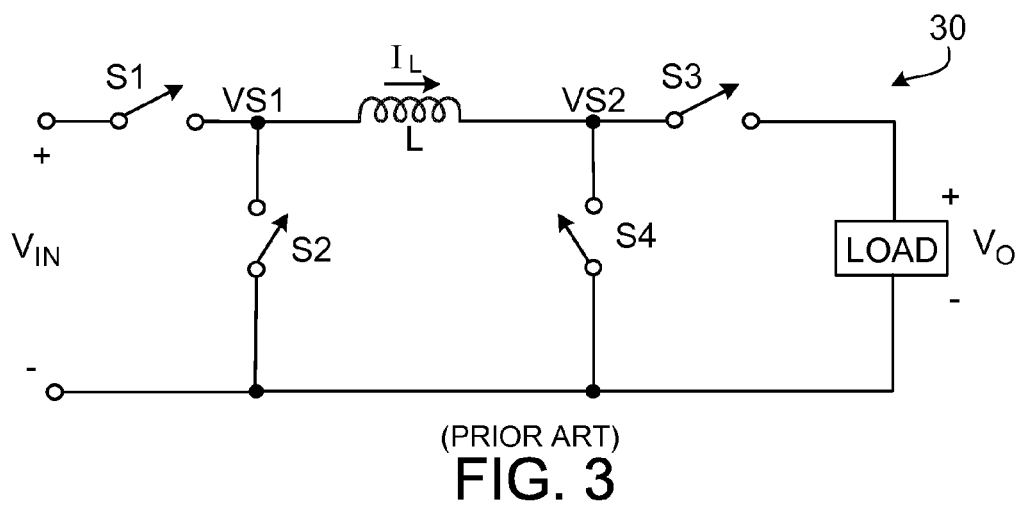
FIG. 3 shows a buck-boost converter topology.
Figure 4:
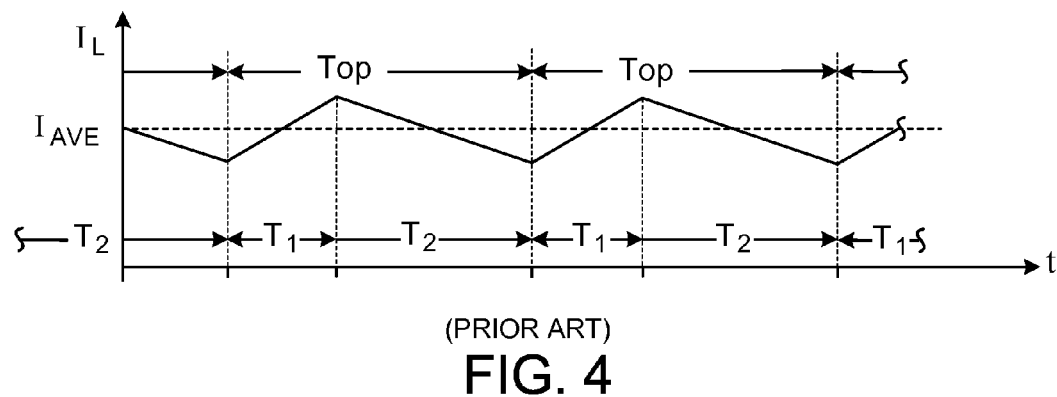
FIG. 4 shows a current waveform in an idealized buck or boost converter operating in a continuous-conduction mode.
Figure 5:
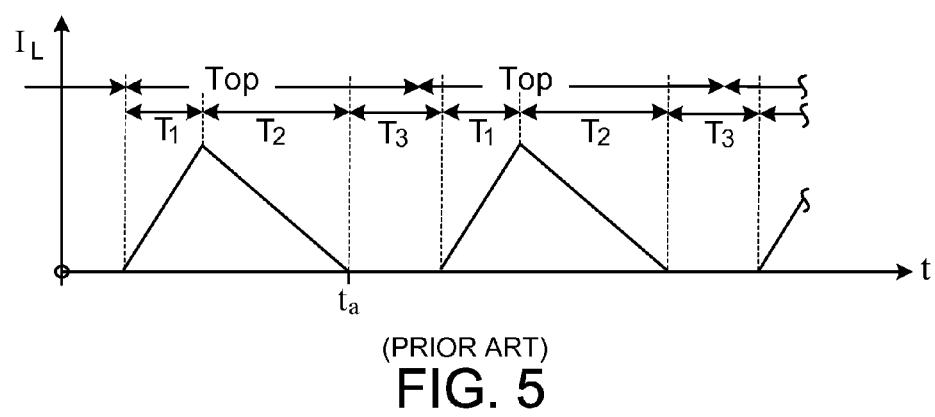
FIG. 5 shows a current waveform in an idealized buck or boost converter operating in a discontinuous-conduction mode.

Switching power converters may employ resonant techniques for reducing, and in some cases eliminating switching losses from parasitic capacitances in the semiconductors. Zero voltage switching ("ZVS") and "full ZVS" as used herein refer to essentially fully charging or discharging the parasitic, and sometimes other, capacitances in a circuit, such that there is essentially zero voltage across the relevant switch when it is closed. "Partial ZVS" as used herein refers to partially charging or discharging the parasitic, and sometimes other, capacitances in a circuit, such that there is a reduced but non-zero voltage across the relevant switch when it is closed. In an ideal ZVS converter, the circuit which carries the freewheeling current between the inductor and the load is broken as close in time to the inductor current returning to zero as possible ("zero-crossing timing"); however, as noted above and in the 072 Patent, the inductor current may reverse and a small amount of negative current may flow in the inductor in actual ZVS converters due to imperfect components, e.g. diode reverse recovery time. For clarity, switch S2 (S3) may be opened to break the circuit carrying the freewheeling current in the buck converter 10 of FIG. 1 (boost converter 20 of FIG. 2), and either one of switches S2 or S3 (analogous switches Q2, Q3) may be opened to break the circuit carrying the freewheeling current in the buck-boost converter 30 of FIG. 3 (double-clamped converter of FIG. 1 in the Double-Clamped Patent; see also FIG. 17).

Figure 6:
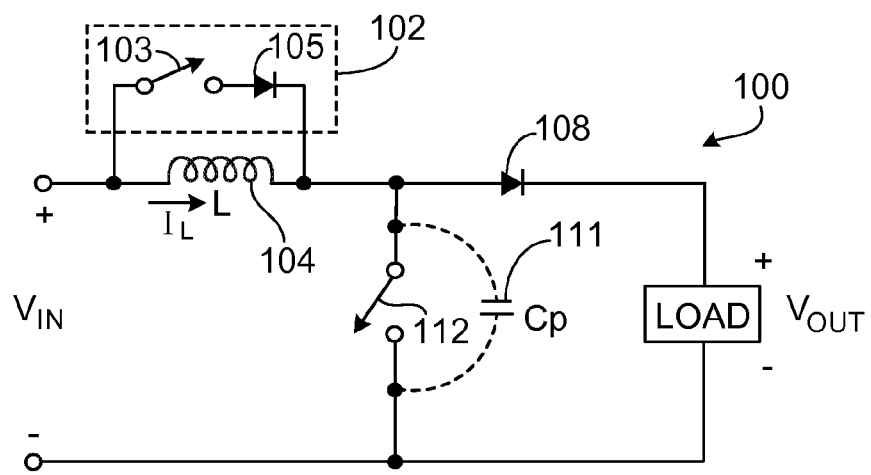
FIG. 6 shows a boost converter comprising clamp circuitry.
Figure 7:
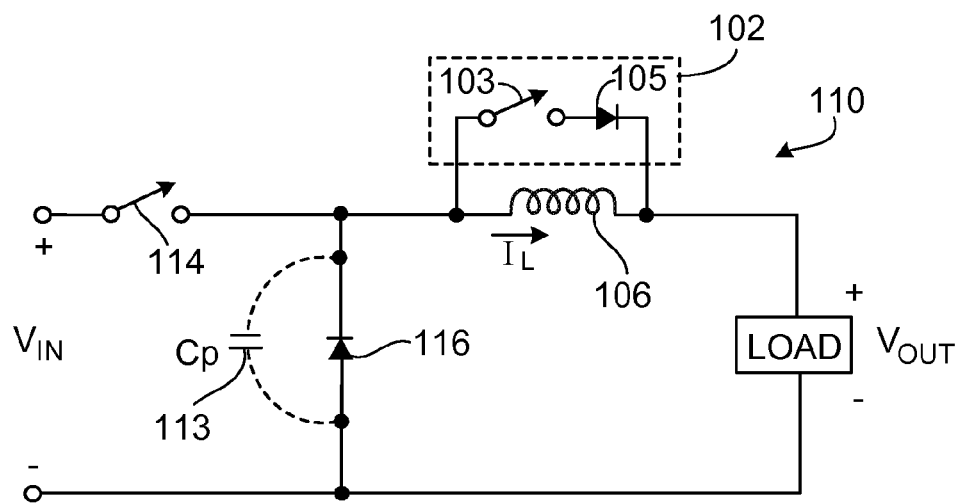
FIG. 7 shows a buck converter comprising clamp circuitry.

ZVS converters are generally designed to achieve ZVS at a particular operating point or within a range of operating points (often narrower than the operating conditions required of the converter) because the energy available to charge and discharge the circuit capacitances is generally dependent upon the input voltage to output voltage ratio. This is true for the boost converter (100 in FIG. 6), buck converter (110 in FIG. 7), buck-boost converter (30 in FIG. 3), and double-clamped converter (Double-Clamped Patent), in which full ZVS is generally dependent upon the ratio of input voltage to output voltage. Consider for example the buck-boost converter 30 of FIG. 3 at the end of the freewheeling phase: switches S1 and S4 are OFF, switches S2 and S3 are ON, and the inductor current is declining. If switch S3 is turned OFF at the instant the inductor current reaches zero, the energy stored in the capacitance at node VS2 available for charging and discharging the capacitances at node VS1 for ZVS turn ON of switch S1 (assuming linear capacitances) may be expressed as:

$$E_{ZVS2} = \tfrac{1}{2} C_{VS2} (V_{S2})^2. \quad [\text{EQ1}]$$

VS2 will essentially equal Vo when switch S3 is opened at the end of the freewheeling phase. Therefore, the available energy is dependent on the output voltage:

$$E_{ZVS2} = \tfrac{1}{2} C_{VS2} (V_O)^2. \quad [\text{EQ2}]$$

The energy required to charge and discharge the capacitances at node VS1 (assuming linear capacitances) may be expressed as:

$$E_{ZVS1} = \tfrac{1}{2} C_{VS1} (V_{in} - V_{S1})^2. \quad [\text{EQ3}]$$

When switch S2 is opened VS1 will essentially be zero volts, therefore the VS1 node will need to be charged from zero to Vin for full ZVS operation of switch S1. The energy required for ZVS of switch S1 is therefore dependent on the input voltage:

$$E_{ZVS1} = \tfrac{1}{2} C_{VS1} (V_{in})^2. \quad [\text{EQ4}]$$

Full ZVS operation is possible as long as the available energy from node VS2 exceeds the energy required by node VS1:

$$E_{ZVS2} \geq E_{ZVS1}. \quad [\text{EQ5}]$$

Substituting equations EQ2 and EQ4 into equation EQ5 results in the following inequality:

$$\tfrac{1}{2} C_{VS2} (V_O)^2 \geq \tfrac{1}{2} C_{VS1} (V_{IN})^2. \quad [\text{EQ6}]$$

Assuming that the node capacitances are equal, i.e. $C_{VS2} = C_{VS1}$, full ZVS will be possible as long as Vo≥Vin. Stated another way, a buck-boost (or double-clamped) converter essentially operating at the zero-crossing timing and having balanced node capacitances may achieve ZVS for ratios of Vo:Vin (or Vo-primary-reflected:Vin)≥1. Similarly, a boost (or buck) converter essentially operating at the zero-crossing timing may achieve full ZVS for ratios of Vo:Vin≥2 (Vin:Vo≤2).

Figure 1:
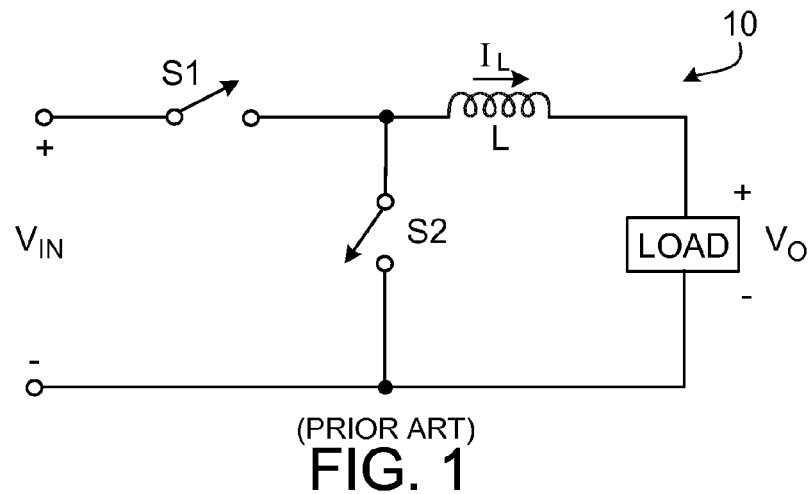
FIG. 1 shows a buck converter topology.

Some adjustments may be made to provide for ZVS at other voltage ratios. For example, as implied by equation EQ6 above, capacitance may be added across node VS2 in the buck-boost converter of FIG. 3 to allow for ZVS for greater than unity operating ratios. Similarly, capacitance may be added to the analogous node in the double-clamped converter, e.g. capacitance C4 140 as shown in FIG. 1 and described at col. 10, lines 26-37 of the Double-Clamped Patent to adjust the ZVS range. Broadening the ZVS range in this way may come at the expense of increased losses for operating ratios Vo:Vin<1. In any event, the fact remains that the ZVS range of a converter is too narrow for general purpose application. Outside of the narrow ZVS range, the converter may achieve partial ZVS, accumulating losses which increase as the input voltage, or output voltage, or both move away from the ideal ZVS range.

Buck Converter Example

Figure 8:
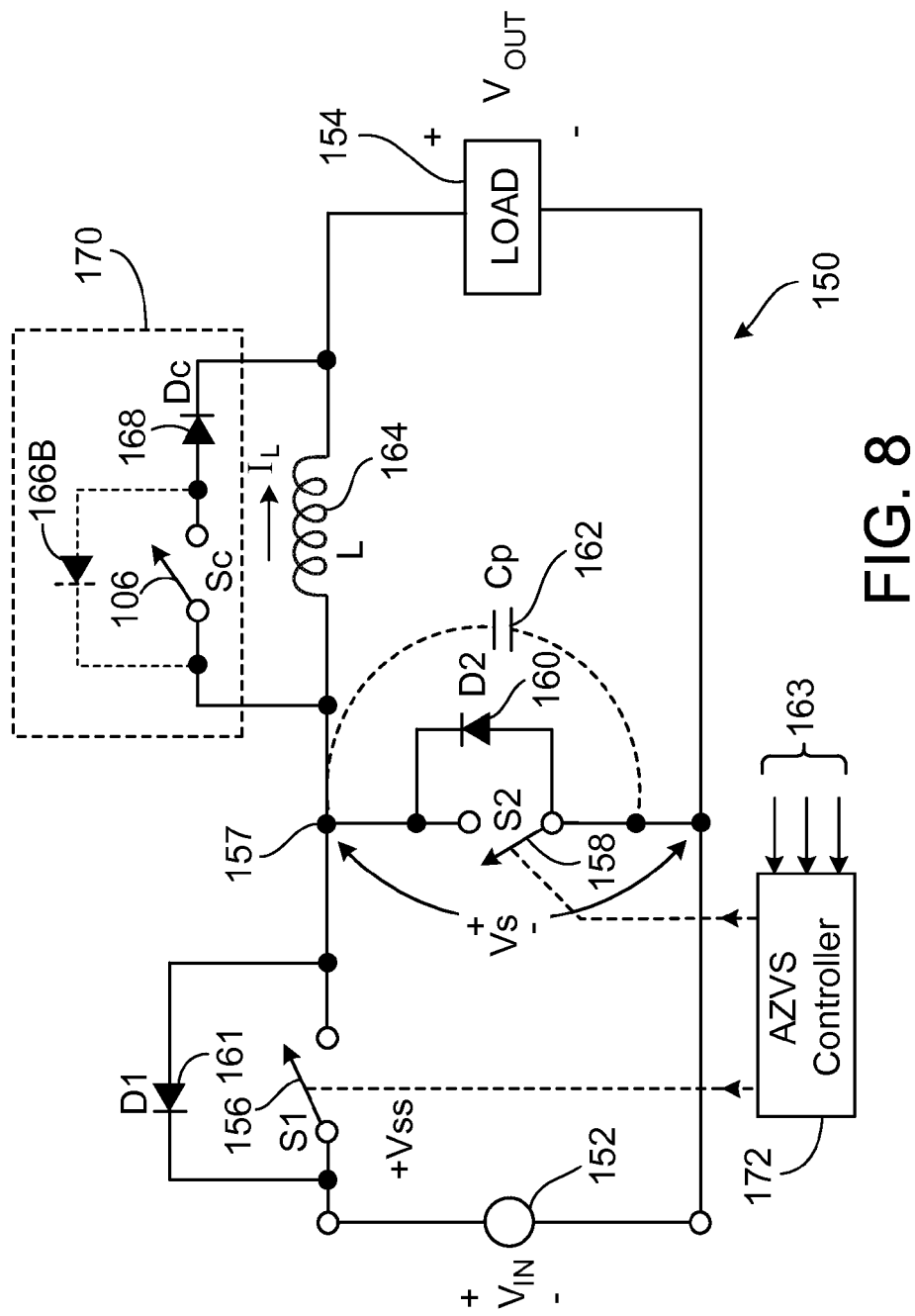
FIG. 8 shows a buck converter according to the present disclosure.

FIG. 8 shows a schematic of a non-isolated buck switching power converter 150 comprising an adaptive zero-voltage-switching ("AZVS") controller 172, which as described below enables the converter to achieve full ZVS over a wide range of operating conditions without incurring excess losses. The switching power converter accepts a unipolar input voltage, Vin, from an input source 152 and delivers a DC output voltage, Vo, to a load 154, where Vin>Vo. (The generic loads referenced herein may be assumed to include energy storage such as a storage capacitance.) The buck converter 150 includes switches S1 156 and S2 158; a clamp circuit 170, comprising clamp switch Sc 166 (having an intrinsic diode 166B) and clamp diode Dc 168; and an inductor L 164. Parasitic capacitance Cp 162 represents the parasitic capacitance of the circuit elements connected to node 157. Diodes D1 161 and D2 160 across switches S1 156 and S2 158, respectively, may be intrinsic to the switches such as the body drain diode of a MOSFET, or may be discrete diodes connected across the switches. The term "switch" used hereinafter may include a controllable switch in parallel with an intrinsic or externally added diode. The AZVS controller 172 controls the timing of switches S1 and S2 to regulate the converter output voltage, Vo, in the presence of fluctuations in input voltage and load, and to affect zero voltage switching of switches S1 and S2, i.e. to enable switches S1 and S2 to be turned on and off at substantially zero voltage, as further described below.

In the example of FIG. 8, the switches S1 156 and S2 158 may be considered as forming a series circuit having a first terminal 165 and a second terminal 167 that are connected across an input of the converter 150. The series circuit has a central node (e.g., node 157) for connecting to one end of the inductor L 164. The switch S1 is connected between the first terminal 165 and the central node, and the switch S2 is connected between the second terminal 167 and the central node.

FIGS. 9A through 9E show operating waveforms for the converter of FIG. 8. Between times $t_0$ and t3, the converter operates in essentially the same manner as the equivalent converter described in the 072 Patent. Referring to FIGS. 9A-9E, between times $t_0$ and t1 switch S1 is ON (FIG. 9A) and energy is transferred from the input source 152 to the inductor 164 and the load 154. Between times t1 and t2, all switches are controlled to be OFF by the AZVS controller and the positive current, $I_L$, flowing in inductor L discharges the parasitic capacitance, Cp, causing the voltage Vs to decrease (FIG. 9D). At time t2, the voltage across the parasitic capacitor, Cp, decreases to approximately zero and diode D2 160 begins conducting, carrying current $I_L$ and clamping the voltage, Vs, across switch 158, at approximately zero volts (FIG. 9D). Between times t2 and t3, the converter output voltage, Vo, is impressed across the inductor 164 causing the current in the inductor to decrease (FIG. 9E). The inductor current, $I_L$, reaches zero at time t3. The interval between times t2 and t3, during which switch S2 (and/or diode D2) is conductive, and the inductor current is positive (i.e. has a first polarity), and the inductor current, $I_L$, decreases to zero, may be called the "freewheel phase" of the converter operating cycle. (As used herein, a switch is conductive when either the switch (controlled to be ON) and/or its associated diode is conductive.) Energy is transferred from inductor 164 to load 154 during the freewheel phase of the converter 150 (FIG. 8). Switch S2 (which preferably may be a low resistance device) may be turned ON by the AZVS controller 172 at any time between times t2 and t3, but preferably at a time coincident with, or shortly after, time t2 (as shown in FIG. 9B) to reduce conduction losses that would otherwise be associated with current flow in diode D1.

The AZVS controller 172 may keep switch S2 ON past when the inductor current reaches zero, time t3, enabling the inductor current $I_L$ to reverse in polarity and to increase in magnitude (FIG. 9E) until the AZVS controller 172 turns switch S2 OFF at time t4 (FIG. 9B). The interval between times t3 and t4, during which switch S2 is conductive and the inductor current is allowed to increase in magnitude with a reverse polarity may be called the "reverse energy phase" of the converter operating cycle. During the reverse energy phase, energy is transferred in reverse from the load 154 to the inductor 164, building up "reverse" energy, $E_{rev}$, (i.e. opposite polarity) in the inductor for subsequent ZVS. The amount of reverse energy, $E_{rev}$, stored in the inductor may be expressed as:

$$E_{rev} = \tfrac{1}{2} L (I_{rev})^2 \qquad [EQ7]$$

Adding reverse energy in the inductor changes the ZVS energy inequality adding an adaptively controllable term. For example, adding the above reverse energy term to the inequality EQ6 and simplifying, results in the following revised expression for the ZVS energy of the converter:

$$C_{VS2}(V_O)^2 + L(I_{rev})^2 \ge C_{VS1}(V_{IN})^2 \qquad [EQ8]$$

The amount of reverse energy stored in the inductor, $E_{rev}$, may be controlled by adjusting the reverse energy phase. For example, AZVS controller 172 may control the duration for which switch S2 remains conductive after the inductor current reverses polarity (e.g., the interval t3 to t4). The longer switch S2 remains conductive during the reverse energy phase, the more energy that will be stored in the inductor; and conversely, for shorter periods less energy will be stored which may be taken to the limit in which t4=t3 and essentially no reverse energy is stored in the inductor (subject to the above observations relating to the switching characteristics of non-ideal components such as turn off delays and reverse recovery periods).

The duration of the reverse energy phase may be preprogrammed, .e.g. factory or field programmed, for a specific operating range to store a predetermined amount of reverse energy in the inductor L at the end of the reverse energy phase, $E_{rev}$, sufficient to turn S1 on at substantially zero voltage for expected operating conditions. Preferably, however, the AZVS controller 172 may adaptively adjust the reverse energy phase during converter operation, based upon sensed circuit operating conditions to set the amount of reverse energy stored in the inductor L at the end of the reverse energy phase, $E_{rev}$, preferably at the ideal level, sufficient to turn S1 on at substantially zero voltage but not so high as to incur excess losses. The adaptive control scheme may be open loop based upon operating conditions or a closed loop feedback path may be used to make fine adjustments as described below. By reducing switching losses over a broader range of ratios of input to output voltages, controlling the duration of the reverse energy phase may enable efficient power conversion at higher operating frequencies.

As indicated by the dashed waveforms in FIG. 9C, switch Sc 166 may be turned ON as early as when the magnitude of Vs falls below the magnitude of the output voltage, Vo (time tc, FIG. 9D) because the clamp diode Dc 168 will be reverse biased, and before switch S2 is turned OFF (time t4, FIG. 9B). Following time t4, with switch S2 OFF, the negative inductor current flows into the parasitic capacitance Cp causing the voltage Vs to ring up at a resonant frequency determined by the values of L and Cp. At time t5, when the voltage Vs rings up to approximately equal the output voltage V0 (FIG. 9D), the negative inductor current will commutate into the clamp circuit 170. Ignoring losses in Sc and Dc, this will effectively trap the energy in the inductor until switch Sc is subsequently opened. As defined herein, the term "clamp phase" refers to the time interval during which a clamp circuit (e.g., clamp circuit 170) traps energy in an inductive element (e.g., the interval between time t5 and t6, FIG. 9) in contrast to the time interval during which a clamp switch may be ON but may not be trapping energy in the inductor, e.g. due to reverse bias of the clamp diode.

At time t6 the AZVS controller turns switch Sc OFF, ending the clamp phase. Between time t6 and time t7 the negative current flowing in the inductor voltage will flow in the parasitic capacitance Cp and Vs will ring up at a resonant frequency determined by the values of L and Cp. In FIG. 10, which shows an expanded view of a portion of the waveform of FIG. 9D between times t6 and t7, the voltage Vs rings up after time t6 with a peak excursion, Vspk, that is principally dependent upon the magnitude of the negative current, −Ix, that flows in the inductor at time t6 (FIG. 9E) and the magnitudes of L and Cp. The dashed line in FIG. 10 shows how the voltage Vs would continue to oscillate if S1 were not turned ON at time t7. The dashed line depicts a sinusoidal waveform based upon the approximation of a linear, i.e., voltage independent, Cp; however, actual FET capacitances may exhibit non-linear behavior.

By delaying the turning ON of switch S1 until approximately the time of occurrence of the peak excursion of Vs (e.g. at time t7, FIGS. 9 and 10), and by adjusting the reverse energy phase so that the magnitude of −Ix results in Vspk being substantially equal to Vin−Vo, the AZVS controller may adaptively control the turning ON of switch S1 to occur at essentially zero voltage, thereby substantially reducing or eliminating switching loss in S1, over a range of operating conditions, including a range of Vin values or Vin:Vo ratios. As noted above, a ZVS buck converter may achieve full ZVS for Vin:Vo ratios less than 2 while essentially operating at the zero-crossing timing, obviating the need for the reverse energy phase and AZVS control in that range. However, as the Vin:Vo ratio increases past 2, the AZVS controller will increase the duration of the reverse energy phase, enabling ZVS over a broader range. Thus the AZVS is most advantageous in buck converters (150 in FIG. 8) operating with a Vin:Vo ratio greater than 2.

AZVS Controller Example

Figure 11:
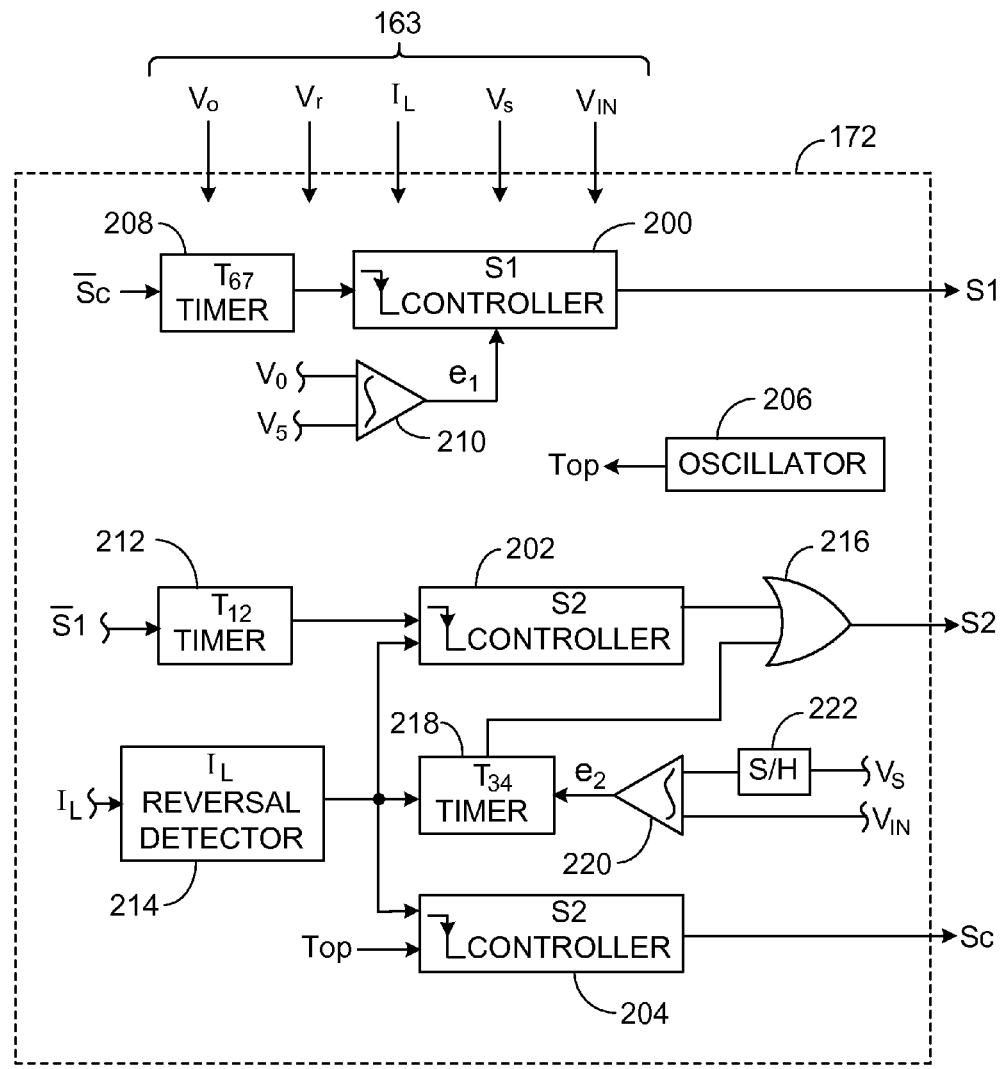
FIG. 11 is a block diagram of an embodiment of an AZVS controller according to the present disclosure.

A block diagram of one embodiment of an AZVS controller 172 is shown in FIG. 11 including inputs 163 for sensing operating conditions of the converter 150, e.g. the converter output voltage, Vo; a reference voltage, Vr, indicative of a desired set-point value for the converter output voltage; a measurement of the inductor current, $I_L$; a measurement of the voltage, Vs, across switch S2 158; and a measurement of the converter input voltage, Vin. The AZVS controller 172 may include an oscillator 206 for setting the operating frequency, Fop, and operating period, Top (FIG. 9), of the converter.

A new converter operating cycle may be initiated by a Top pulse from the oscillator 206. In response to the Top pulse, the clamp switch controller 204 turns the clamp switch, Sc, OFF (time t6, FIG. 9C) ending the clamp phase and the T67 delay timer 208 delays turning ON switch S1 (which starts a new converter operating cycle) until the voltage across switch S2 has rung up (at time t7, FIG. 9D, as described earlier). The duration of the T67 timer (e.g., time interval t6 to t7, FIG. 9) may either be fixed, based upon known values for L and Cp, or it may comprise circuitry for monitoring the rise of Vs during the interval t6 to t7 and sensing the time at which the voltage reaches its maximum (e.g., Vspk, FIG. 10).

Figure 9:
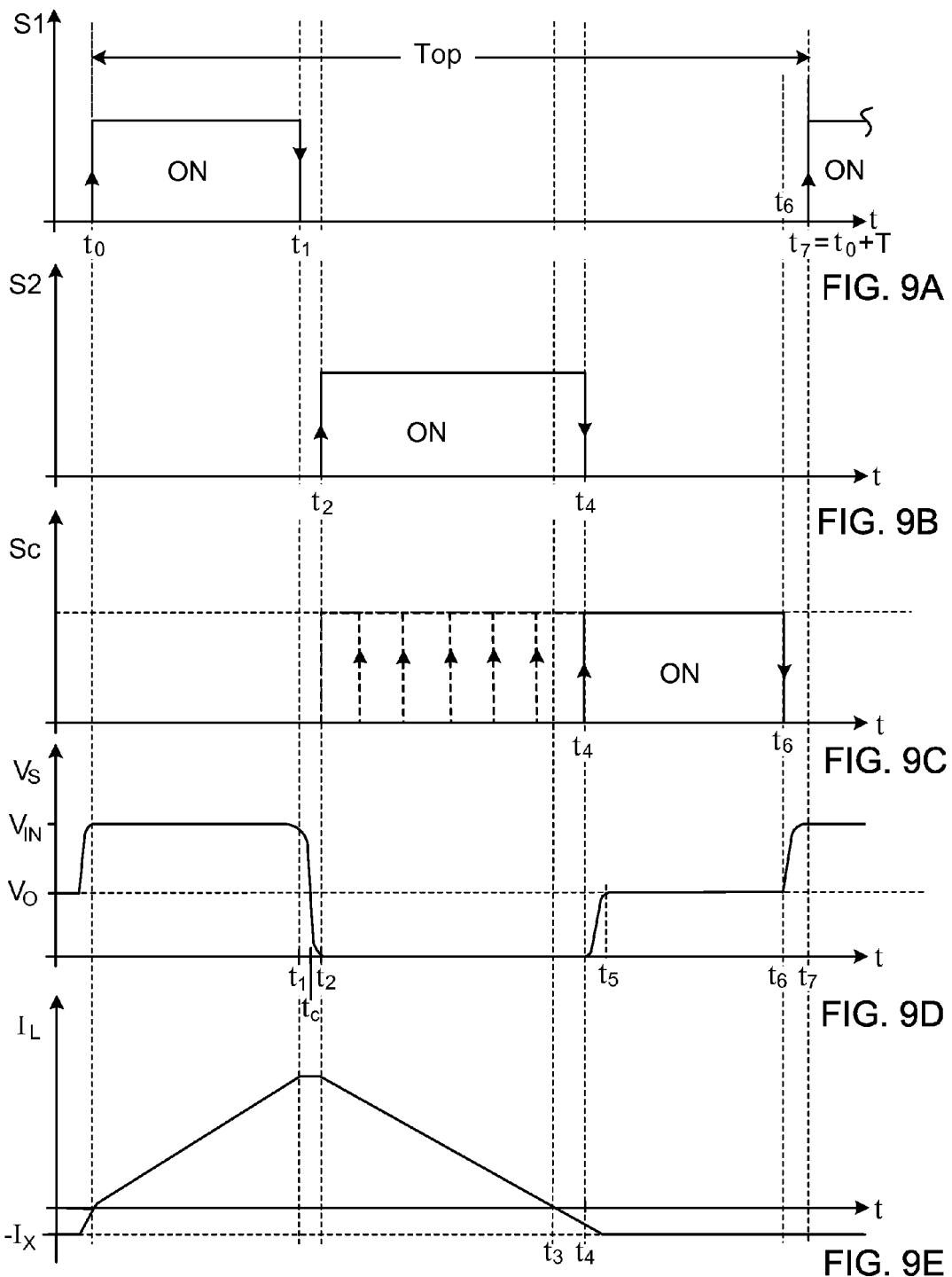
FIGS. 9A through 9E show waveforms for the converter of FIG. 8.
Figure 10:
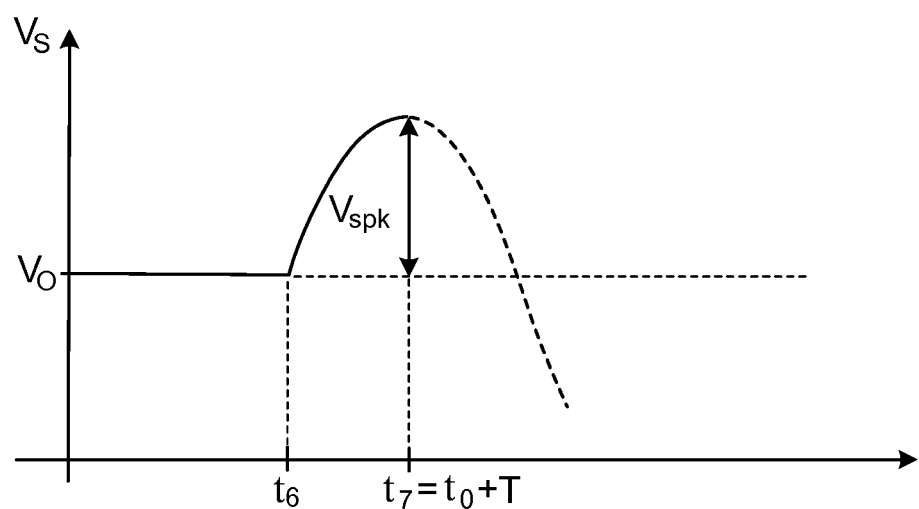
FIG. 10 is an expanded view of a portion of the waveform of FIG. 9D.

The S1 controller block 200 receives the output of the T67 timer and turns switch S1 ON when the T67 timer times out (e.g., at time $t_0$, FIG. 9A). Closed-loop feedback is provided by error amplifier 210 which compares the converter output voltage, Vo, to the reference voltage Vr and outputs an error voltage e1 to the S1 controller 200 which in turn adjusts the ON time of switch S1 (time $t_0$ to time t1, FIG. 9) to maintain Vo in regulation.

The T12 Timer 212 may sense when switch S1 is turned OFF and, after a delay preferably coincident with the voltage across switch S2 ringing down to a minimum (e.g., time interval t1 to t2 as shown in FIG. 9 and described earlier) provides a high output signal to the S2 controller 202 to turn switch S2 ON. Switch S2 is turned ON when the output of OR gate 216 is high, which results when either one or both of its inputs—connected to the output of the S2 controller 202 and the T34 timer—are high. The S2 controller 202 receives the output of the T12 timer and goes high when the T12 timer times out (e.g., at time t2, FIG. 9A), thereby turning switch S2 ON.

A current reversal detector 214 may be used to sense when the polarity of the inductor current, $I_L$, reverses and provide an output signal to the S2 controller 202, the T34 timer 218, and the Sc controller 204. A high output signal from the current reversal detector 214 causes the output of the S2 controller to go low and the output of the T34 timer to go high (which holds the output of OR gate 216 high and switch S2 ON). The high output from the current reversal detector 214 may also cause the Sc controller 204 to turn the clamp switch Sc 166ON which would transition the clamp switch ON with the reversal of current flow in the inductor, i.e. at time t3, which although after tc is before t4. The output of OR gate 216 will remain high, and switch S2 will remain ON until the T34 timer 218 times out. As shown in FIG. 11, the T34 timer 218 may be adjusted by a closed-loop feedback system.

A second closed control loop includes error amplifier 220 which compares a measurement indicative of the magnitude of Vs at time t7 (e.g., from sample-and-hold circuit 222 as shown in FIG. 11) with the magnitude of the input voltage, Vin, and generates an error signal, e2. The T34 timer 218 receives the error signal, e2, and adjusts the duration of the T34 timer, which sets the duration of the reverse energy phase (t3 to t4 in FIG. 9). Using the error between Vin and the magnitude of Vs at time t7 to set the duration of the reverse energy phase, i.e. time t4, adjusts the magnitude of the reverse inductor current at the end of the reverse energy phase (time t4) to a level that will minimize the error without incurring excess losses, e.g. due to losses in the switches or inductor. The operating cycle is similarly terminated and restarted when oscillator 206 generates another Top pulse turning the Sc switch OFF and retriggering the T67 timer, ultimately initiating another converter operating cycle.

Figure 12:
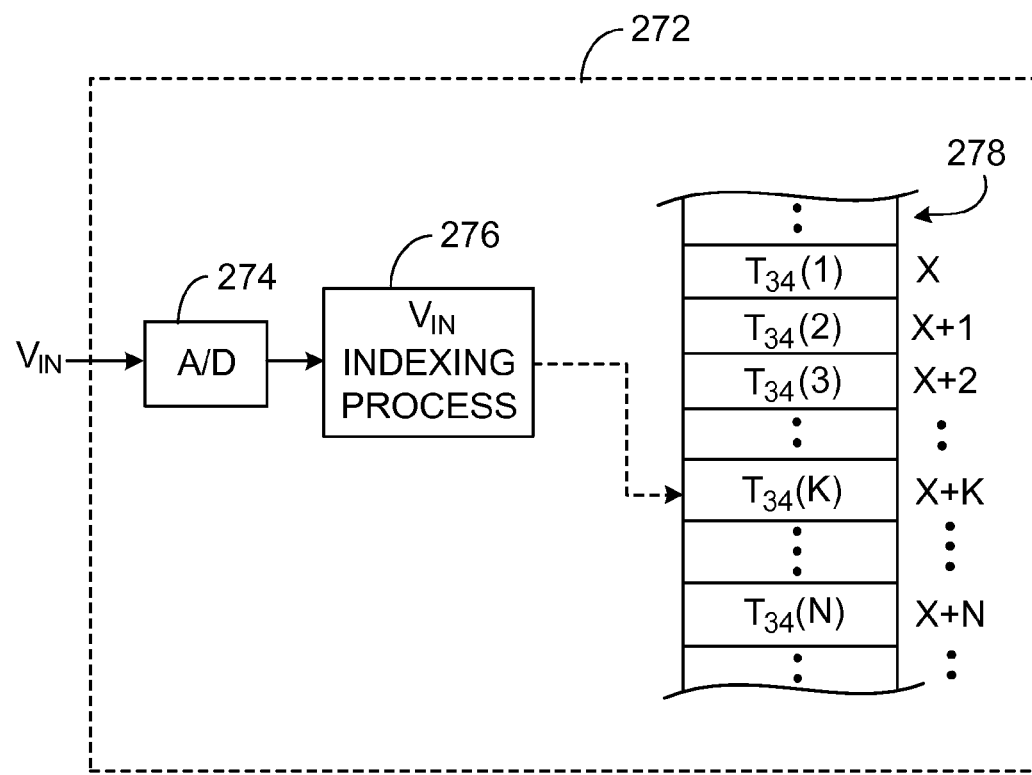
FIG. 12 is a partial block diagram of a digital AZVS controller according to the present disclosure.

FIG. 11 shows one of many possible configurations for an AZVS controller. Some embodiments may, for example, comprise open-loop control, rather than a closed-loop feedback system, or may use digital processing and a lookup table approach. The example shown in FIG. 12 includes a portion of an AZVS controller 272 comprising an analog-to-digital converter ("A/D") 274; a digital indexing process 276; and a storage memory lookup table 278. The lookup table may comprise N entries, corresponding to N pre-defined settings for the length of the reverse energy phase, T34(1), T34(2) . . . T34(N). The process may include receiving a digitized value representative of the input voltage, Vin, from the A/D 274, calculating and delivering an index into the table 278 based upon the measurement. The controller 272 may set the duration of the reverse energy phase based upon the value stored at the indexed location in the table 278. For an input voltage ranging between 10V and 20V, the table 278 may, for example, be configured to include 20 entries representative of, or related to, the desired duration of the reverse energy phase for each of 20 contiguous 0.5V sub-ranges (e.g., 10V to 10.5V; 10.5V to 11V; 11V to 11.5V . . . 19.5V to 20V) of the input voltage. The controller 272 may, based upon the sensed input voltage, then select the appropriate duration using an index into the table.

Boost Converter Example

Figure 13:
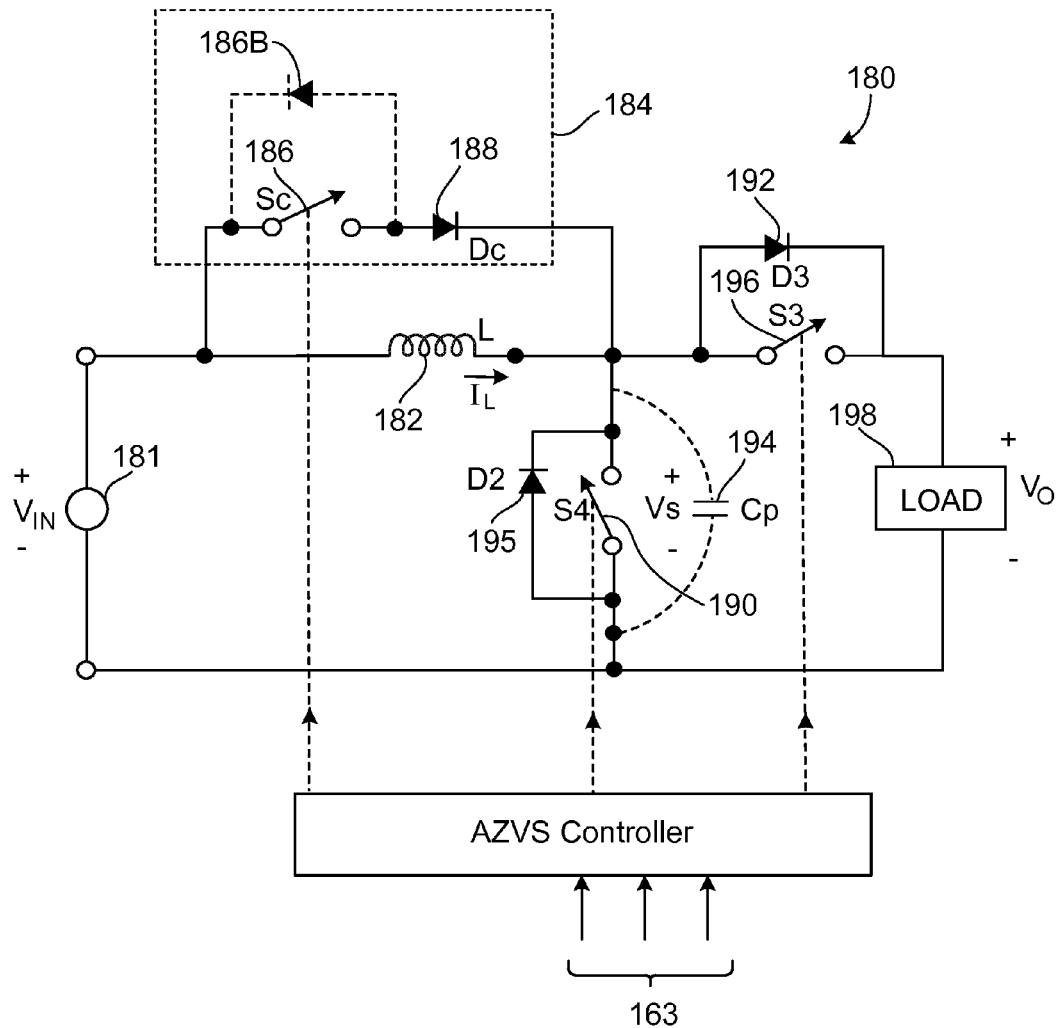
FIG. 13 is a boost converter according to the present disclosure.

The present invention may be applied to certain other switching power converter topologies. FIG. 13 shows a schematic of a discontinuous conduction mode boost converter 180 of the kind described in the 072 Patent, but modified by inclusion of an AZVS controller 372. Waveforms for the converter of FIG. 13 are shown in FIG. 14. In FIG. 14 switch S4 190 is ON between times $t_0$ and t1, causing the inductor current $I_L$ to increase as the energy stored in inductor L 182 increases. Switch S4 is turned OFF at time t1. From time t1 to t2, the current $I_L$ charges parasitic capacitance, Cp 194, until the voltage Vs is substantially equal to Vo, at which time diode D3 192 (which may be intrinsic to switch S3 196 and/or a discrete diode) begins conducting.

Figures 14A, 14B:
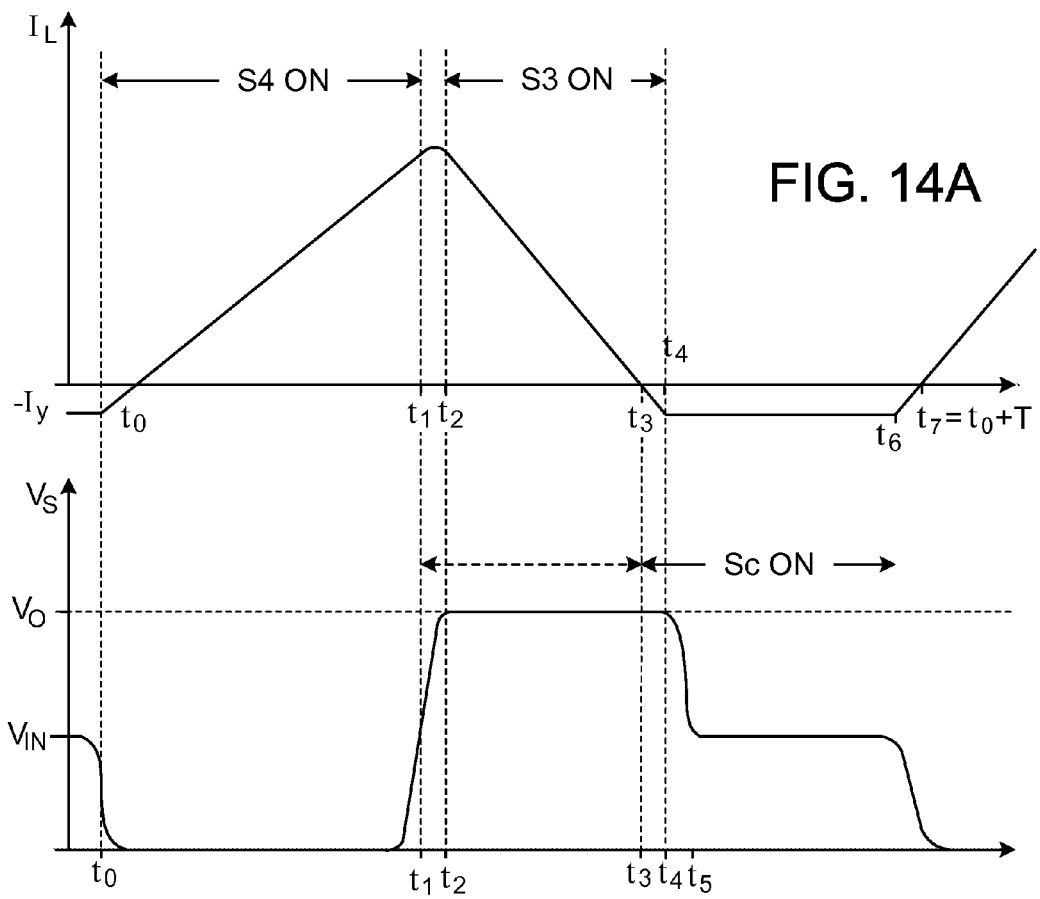
FIGS. 14A and 14B show waveforms for the converter of FIG. 13.

Between times t2 and t3 the converter 180 is operating in a freewheel phase with switch S3 (and/or diode D3) conducting and the inductor current flowing with a first polarity and decreasing toward zero. Switch S3 may be turned ON by the AZVS controller at any time between times t2 and t3, but preferably switch S3 is a low resistance device that is turned ON at a time coincident with, or shortly after, time t2 (as shown in FIG. 14A) to reduce conduction losses that would otherwise be associated with current flow in diode D3.

After time t3, the converter may enter a reverse energy phase, during which switch S3 is held ON enabling the inductor current $I_L$ to reverse in polarity and to increase in magnitude (FIG. 14A) until it reaches the requisite level, e.g. value –Iy, (as described above in connection with FIGS. 8-12) at which time (time t4 in FIG. 14A) the AZVS controller may turn switch S3 OFF (FIG. 14A) stopping the build up of reverse energy in the inductor. Following the turn OFF of switch S3 at time t4, the negative flow of inductor current may be used to discharge the parasitic capacitance, Cp 194, enabling switch S4 to be turned ON (e.g., at time t5) at substantially zero voltage.

As described earlier for the buck converter, the reverse energy phase in the boost converter may be followed by a clamp phase (between times t5 and t6, FIG. 14) during which the reverse energy is trapped in the inductor 182. As indicated in FIG. 14, the clamp switch 186 in the boost converter 180 may be turned ON any time after the voltage Vs increases to a value greater than Vin (time tx in FIG. 14B). Note that, although it may be closed earlier, the clamp switch Sc 186 will not clamp the inductor until the parasitic capacitance, Cp 194, across switch S4 is discharged sufficiently to allow Vs to fall below Vin. With Vs less than Vin, the clamp diode Dc 188 may conduct clamping the inductor. During the clamp phase, the voltage Vs is substantially equal to Vin. The clamp phase ends when the AZVS controller turns the clamp switch OFF (time t6 in FIG. 14B).

When the clamp phase ends the voltage Vs rings down toward zero volts, the peak excursion in the variation of Vs being a function of the magnitude of –Iy. By delaying the turning ON of switch S4 until approximately the time of occurrence of the peak excursion of Vs (e.g. at time t7, FIG. 14), and by adjusting the reverse energy phase so that the magnitude of –Iy results in the peak excursion being substantially equal to Vin, the AZVS controller 372 may control the turning ON of switch S4 to occur at essentially zero voltage, thereby substantially reducing or eliminating switching loss in S4. In a boost converter according to the present disclosure, the AZVS controller adjusts the reverse energy phase, based upon circuit operating conditions, so that the amount of energy stored in the inductor L at the end of the reverse energy phase is approximately equal to, but preferably no greater than, that required to turn S4 ON at substantially zero voltage. As noted above, a ZVS boost converter may achieve full ZVS for Vo:Vin ratios greater than 2 while essentially operating at the zero-crossing timing, obviating the need for the reverse energy phase and AZVS control in that range. However, as the Vo:Vin ratio falls below 2, the AZVS controller will increase the duration of the reverse energy phase, enabling ZVS over a broader range. Thus the AZVS is most advantageous in boost converters (180 in FIG. 13) operating with a Vo:Vin ratio less than 2.

Buck-Boost Converter Example

Figure 15:
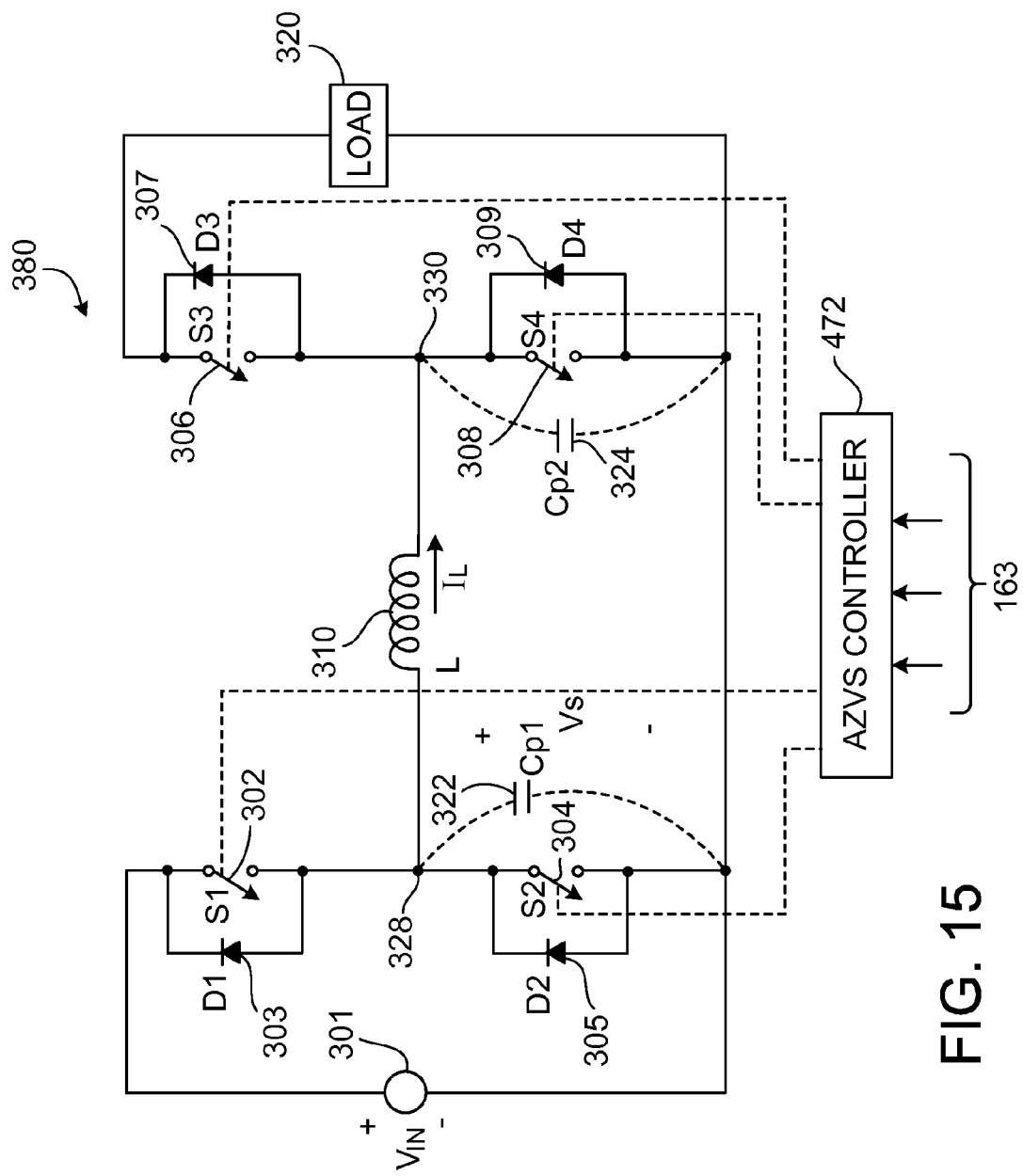
FIG. 15 is a buck-boost converter according to the present disclosure.

FIG. 15 shows a schematic of a buck-boost converter 380 of the kind described in the Buck-Boost Patent, but modified by inclusion of an AZVS controller 472. In this example, the switches S1 302 and S2 304 may be considered as forming a first series circuit having a first terminal 311 and a second terminal 312 that are connected across an input of the converter 380. The first series circuit has a central node 328 for connecting to one end of the inductor L 310. The switch S1 is connected between the first terminal 311 and the central node 328, and the switch S2 is connected between the second terminal 312 and the central node 328. The switches S3 306 and S4 308 may be considered as forming a second series circuit having a first terminal 313 and a second terminal 314 that are connected across an output of the converter 380. The second series circuit has a central node 326 for connecting to another end of the inductor L 310. The switch S3 is connected between the first terminal 313 and the central node 326, and the switch S2 is connected between the second terminal 314 and the central node 326.

FIG. 16 shows waveforms for the converter 380 operating in a boost mode: FIGS. 16A through 16D show the states of switches S1 302, S2 304, S3 306 and S4 308, respectively; FIG. 16E is a waveform of the current, $I_L$, in the inductor L 310; and FIG. 16F is a waveform of the voltage Vs across switch S2 304. Operation of the converter between times $t_o$ and t4 is as described in detail in the Buck-Boost Patent and therefore will not be repeated here. Between times t4 and ty converter 380 operates in a freewheel phase with switch S3 and switch S2 conductive and current flowing in the inductor with a first polarity (positive) and decreasing toward zero.

The converter may enter a reverse energy phase (at time ty) during which switch S3 may be held ON, enabling the inductor current $I_L$ to reverse in polarity and to increase in magnitude until it reaches the requisite level (as described above), e.g. value –Iz, at which time (t5 in FIG. 16E), the AZVS controller may turn switch S3 OFF (FIG. 16C), stopping the build up of reverse energy in the inductor. Between times t5 and t6 the negative flow of inductor current may be used to discharge parasitic capacitance Cp2 324 at node 326, enabling switch S4 to be turned ON at substantially zero voltage (time t6, FIG. 16D).

Figure 16A:
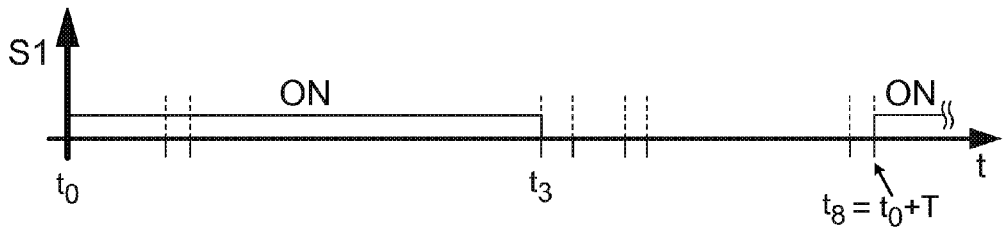
FIGS. 16A to 16F show waveforms for the converter of FIG. 15.
Figure 16B:
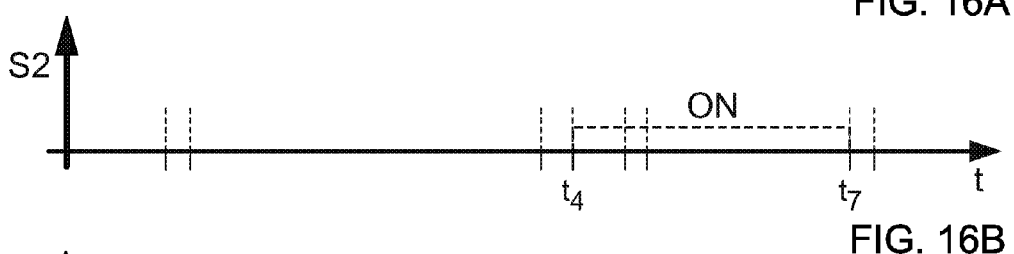
Figure 16C:
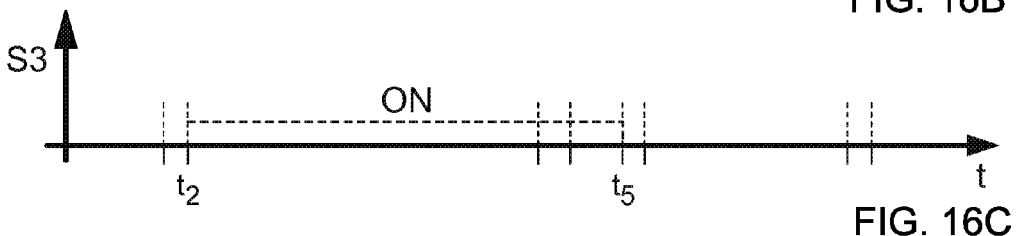
Figure 16D:
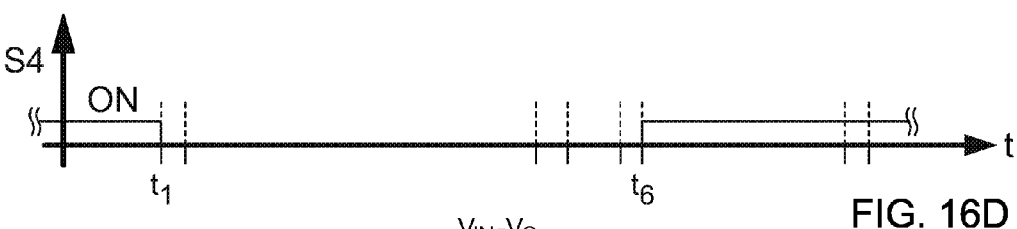
Figure 16E:
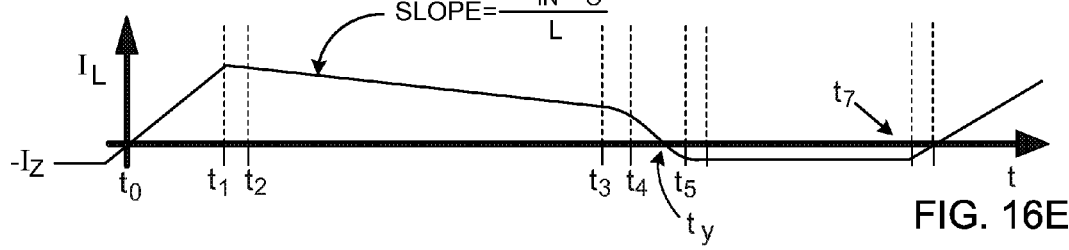
Figure 16F:
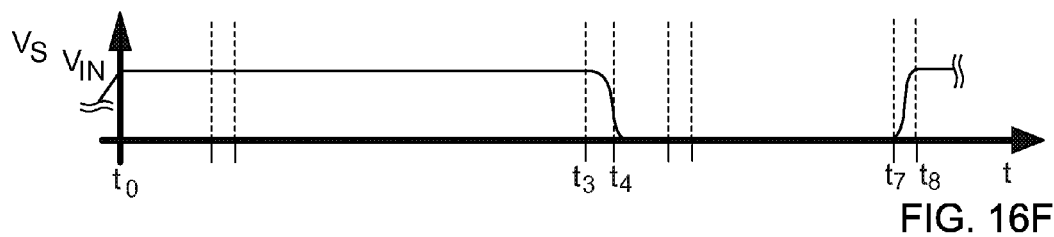

Between time t6 and t7 switches S2 and S4 are both ON and the converter 380 operates in a clamp phase during which energy is trapped in the inductor 310. To terminate the clamp phase, the AZVS controller may turn switch S2 OFF (time t7 in FIG. 16B). At the end of the clamp phase, the negative current in the inductor charges the parasitic capacitance, Cp1, increasing voltage Vs, the peak excursion in the variation of Vs being a function of the magnitude of –Iz (FIG. 16E). By delaying the turning ON of switch S1 until approximately the time of occurrence of the peak excursion of Vs (e.g. at time t8, FIG. 16A), and by adjusting the reverse energy phase so that the magnitude of –Iz results in the peak excursion being substantially equal to Vin, the AZVS controller 472 may control the turning ON of switch S1 to occur at essentially zero voltage, thereby substantially reducing or eliminating switching loss in S1.

Operation of the buck-boost converter 380 in a buck mode between times t4 and t8 is substantially the same as that described for the converter operating in a boost mode. In a buck-boost converter 380 according to the present disclosure, the AZVS controller adjusts the reverse energy phase, based upon circuit operating conditions, so that the amount of energy stored in the inductor L at the end of the reverse energy phase is approximately equal to, and preferably not greater than, that which is required to turn S1 on at substantially zero voltage. As noted above, a ZVS buck-boost converter may achieve full ZVS for Vo:Vin ratios greater than or equal to 1 while essentially operating at the zero-crossing timing, obviating the need for the reverse energy phase and AZVS control in that range. However, as the Vo:Vin ratio decreases below unity, the AZVS controller will increase the duration of the reverse energy phase, enabling ZVS over a broader range. Thus the AZVS is most advantageous in buck-boost converters (380 in FIG. 15) operating with a Vo:Vin ratios less than 1.

Double-Clamped Converter

Figure 17:
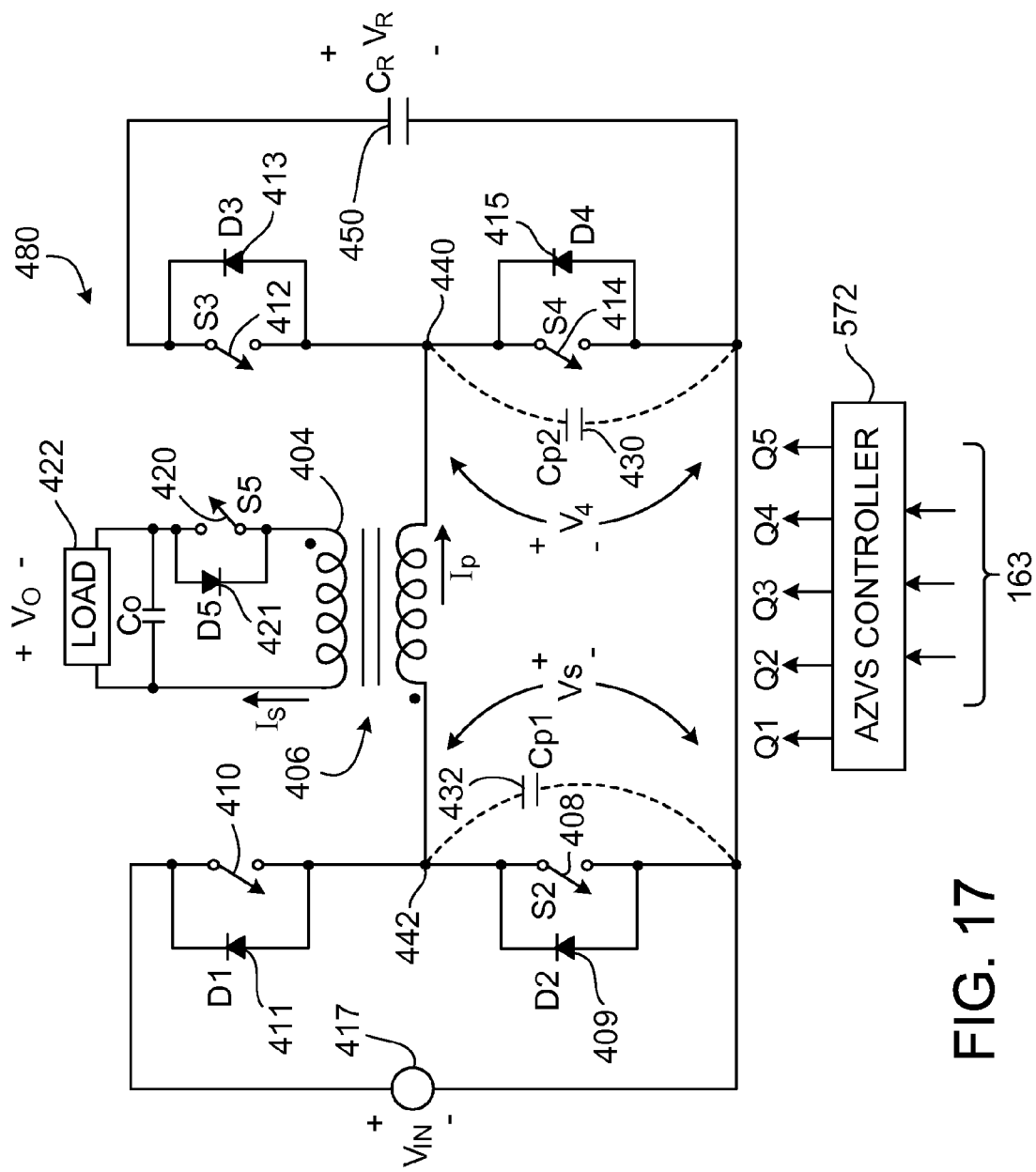
FIG. 17 is a double-clamped buck-boost converter according to the present disclosure.
Figure 18A:
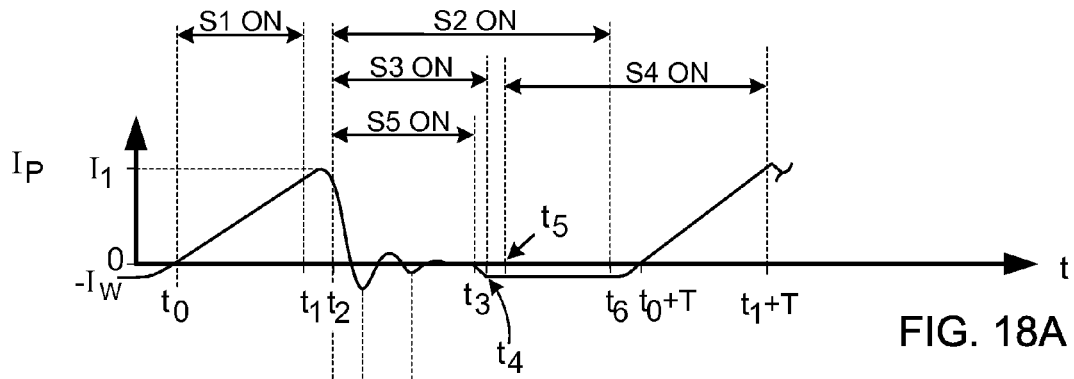
FIGS. 18A to 18D show waveforms for the converter of FIG. 17.
Figure 18B:
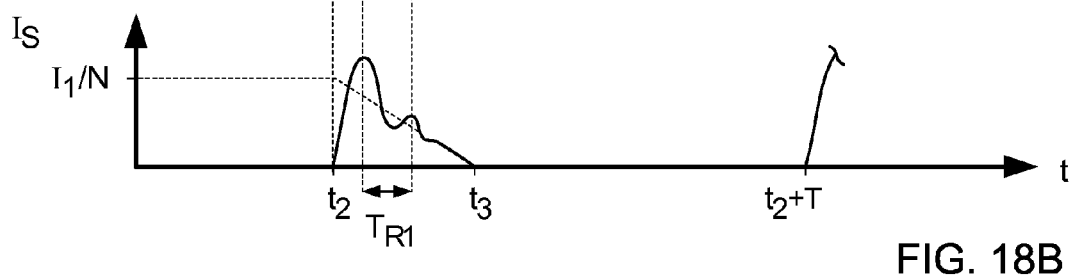
Figure 18C:
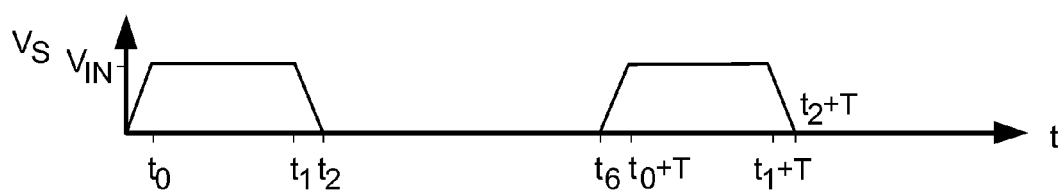
Figure 18D:
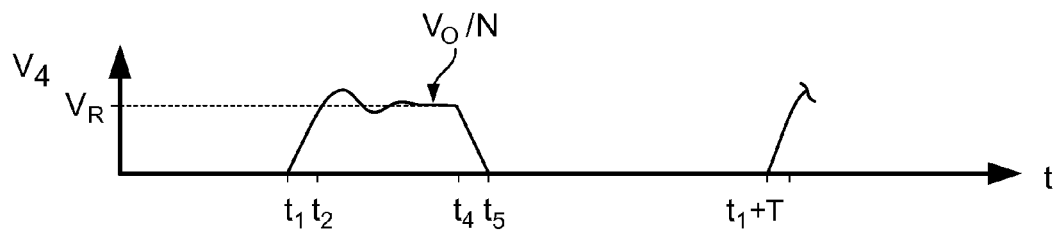

FIG. 17 shows a schematic of an embodiment of a double-clamped buck-boost converter 480 of the kind described in the Double-Clamped Patent, but modified by inclusion of an AZVS controller 572. FIG. 18 shows waveforms for the converter 480. FIG. 18A is a waveform of the current in the primary winding 402 of transformer 406. FIG. 18B is a waveform of the current in the secondary winding 404 of transformer 406. FIG. 18C is a waveform of the voltage Vs across switch S2 408. FIG. 18D is a waveform of the voltage V4 across switch S4 414. A detailed description of the operation of the converter 480 between times $t_0$ and t2 is found in the Double-Clamped Patent. Between times t2 and t3 converter 480 operates in a freewheel phase during which switches S2 and S3 (and S5) are conductive and magnetizing current (FIG. 18B) flows with a first polarity decreasing toward zero at time t3.

After time t3, the converter 480 may enter a reverse energy phase during which switch S3 is held ON, enabling the transformer magnetizing current to reverse in polarity and to increase in magnitude until it reaches the requisite level (as described above), e.g. value –Iw at which time (time t4 in FIG. 18A), the AZVS controller may turn switch S3 OFF stopping the build up of reverse energy in the inductor. Between times t4 and t5 the negative flow of magnetizing current in the primary winding 402 may be used to discharge parasitic capacitance Cp2 430 at node 440 (FIG. 18D), enabling switch S4 to be turned ON at time t5 at substantially zero voltage.

The converter 480 may enter a clamp phase between times t5 and t6 by holding switches S2 and S4 ON and trapping energy in the magnetizing inductance of the transformer 406. The clamp phase may be terminated when the AZVS controller turns switch S2 OFF at time t6 allowing the inductor current to charge parasitic capacitance Cp1 increasing voltage Vs. As discussed above, the peak excursion in the variation of Vs is a function of the magnitude of –Iw (FIG. 18C). By delaying the turning ON of switch S4 until approximately the time of occurrence of the peak excursion of Vs (e.g. at time $t_0$ and $t_0$+T, FIG. 18), and by adjusting the reverse energy phase so that the magnitude of –Iw results in the peak excursion being substantially equal to Vin, the AZVS controller 572 may control the turning ON of switch S1 to occur at essentially zero voltage, thereby substantially reducing or eliminating switching loss in S1.

In the preceding discussion of the double-camped converter, the magnitude of the energy stored in the magnetizing inductance during the reverse energy phase current was controlled by holding switch S3 ON. In general, either switch S3 or S5, or both, may be turned ON to control the amount of stored magnetizing energy. In some embodiments of the double-clamped converter, described in detail in the Double-Clamped Patent, the value of capacitor CR 450 may be relatively small; in such embodiments it may be preferable to transfer energy into the magnetizing inductance by holding S5 ON.

As with the buck, boost, and buck-boost converter topologies described above, the AZVS controller 572 of double-clamped buck-boost converter 480 may adjust the reverse energy phase, based upon circuit operating conditions, to control the amount of reverse energy stored in the magnetizing inductance to be substantially equal to, but preferably not significantly greater than, that required to turn S1 on at substantially zero voltage. As noted above, a double-clamped ZVS converter may achieve full ZVS for primary-reflected Vo:Vin ratios greater than or equal to 1 while operating the switches at or near the ideal zero-crossing inductor-current timing, obviating the need for the reverse energy phase and AZVS control in that range. However, as the primary-reflected Vo:Vin ratio decreases from unity, the AZVS controller will increase the duration of the reverse energy phase, enabling ZVS over a broader range. Thus the AZVS is most advantageous in double-clamped converters (480 in FIG. 17) operating with a primary-reflected Vo:Vin ratio less than 1.

A number of embodiments of the invention have been described. Nevertheless, it will be understood that various variations and modifications may be made without departing from the spirit and scope of the invention. For example, the AZVS controller may use an open loop control of the reverse energy phase. The controller may sense conditions during start-up or other predetermined times to adjust reverse energy phase. The controller may be programmed by inputs to the controller which may be adjusted by external circuitry. The controller may sense the inductor current to adjust the reverse energy phase. Certain other switching power converter topologies may be used in place of the specific converter embodiments described herein. Other embodiments of an AZVS controller and/or a converter comprising an AZVS controller may be implemented as discrete circuits or in the form of software code and/or logical instructions that are processed by a microprocessor, digital processor or other means, or any combination thereof. Logical processes in a digital controller may run concurrently or sequentially with respect to each other or with respect to other processes, such as measurement processes and related calculations. AZVS controllers may be implemented in mixed-signal circuitry; in circuitry comprising mixed-signal circuitry comprising a digital processor core; or in circuitry comprising a combination of mixed-signal circuitry and a separate digital signal processor. They may be implemented as, or as part of, an integrated circuit or a hybrid device. There may also be additional logical processes that may not be shown, such as, e.g., safety and protection mechanisms; timing and frequency generation mechanisms; and hardware and processes related to regulatory requirements. Pre-determined values, such as, e.g., the commanded value of Vr, may be stored in read-only or re-programmable non-volatile memory or other storage media. Communication means may also be incorporated into the converter and/or controller as a means of downloading commanded values or other operating information to the converter and/or for uploading converter operating information to user equipment. The power converters can be isolated or non-isolated.

Accordingly, other embodiments are within the scope of the following claims.

What is claimed is:

1. Apparatus for converting power received via an input from an input source at an input voltage for delivery to a load via an output at an output voltage in a series of converter operating cycles, the apparatus comprising:

an inductor for delivering energy from the input source to the output;

a first series circuit having first and second terminals configured to be connected across either the input or the output and a central node for connection to a first end of the inductor, the first series circuit comprising a first switch connected between the first terminal and the central node and a second switch connected between the second terminal and the central node, the central node being characterized by a node capacitance; and a controller configured to operate the switches in a series of converter operating cycles, the converter operating cycles comprising:

a freewheel phase, during which a selected one of the first or second switches is conductive and a current flowing in the inductor is characterized by a first polarity and a magnitude which begins to decrease;

a reverse energy phase, during which the selected one of the first or second switches is conductive and the current flowing in the inductor is characterized by a second polarity at the end of the reverse energy phase, the second polarity being opposite of the first polarity; and an energy recycling phase, during which the first and second switches are OFF and energy stored in the inductor is used to charge or discharge the node capacitance; and wherein the controller is configured to adjust the reverse energy phase, and the amount of energy stored in the inductor at the end of the reverse energy phase, as a function of the amount of energy required to charge or discharge the node capacitance during the energy recycling phase.

2. The apparatus of claim 1 wherein the controller delays the end of the reverse energy phase to increase the magnitude of the current of the second polarity flowing in the inductor.

3. The apparatus of claim 1 wherein the controller reduces the duration of the reverse energy phase to decrease the magnitude of the current of the second polarity flowing in the inductor.

4. The apparatus of claim 1 wherein the controller adjusts the timing of the end of the reverse energy phase as a function of input voltage.

5. The apparatus of claim 1 wherein the controller adjusts the timing of the end of the reverse energy phase as a function of output voltage.

6. The apparatus of claim 1 wherein the controller adjusts the timing of the end of the reverse energy phase as a function of input voltage and output voltage.

7. The apparatus of claim 1 further comprising a table of stored values and wherein the controller determines an operating parameter, selects an indexed value from the table based on the operating parameter, and uses the indexed value to set the timing of the end of the reverse energy phase.

8. The apparatus of claim 7 wherein the operating parameter is a function of input voltage, output voltage, or both input voltage and output voltage.

9. The apparatus of claim 1 wherein the controller uses a closed loop feedback system to adjust the timing of the reverse energy transfer phase.

10. The apparatus of claim 9 wherein the closed loop feedback system includes an input to sense a voltage at the central node.

11. The apparatus of claim 7 wherein the controller adjusts an amount of time between the inductor current changing polarity and the end of the reverse energy phase.

12. The converter of claim 11 further comprising clamp circuitry configured to trap energy in the inductor; and the converter operating cycles further comprise a clamp phase, during which the clamp circuitry is enabled and the current flowing in the inductor is clamped to retain the second polarity.

13. The converter of claim 1 further comprising clamp circuitry configured to trap energy in the inductor; and the converter operating cycles further comprise a clamp phase, during which the clamp circuitry is enabled and the current flowing in the inductor is clamped to retain the second polarity.

14. The converter of claim 1 wherein the controller is configured to sense the magnitude of the current flowing in the inductor and to terminate the reverse energy phase when a predetermined threshold is reached.

15. The converter of claim 14 wherein the predetermined threshold is adjusted as a function of input voltage, output voltage, or both input voltage and output voltage.

16. The apparatus of claim 1 wherein the output is connected to a second end of the inductor, the first series circuit is connected across the input, and the power conversion is from an input voltage that is higher than the output voltage.

17. The apparatus of claim 1 wherein the first series circuit is connected across the output, a second end of the inductor is connected to the input, and the power conversion is from an input voltage that is lower than the output voltage.

18. The apparatus of claim 13 further comprising:

a second series circuit having third and fourth terminals configured to be connected across the output and a second central node for connection to a second end of the inductor, the second series circuit comprising a third switch connected between the third terminal and the second central node and a fourth switch connected between the fourth terminal and the second central node, the second central node being characterized by a second node capacitance;

wherein the first series circuit is configured to be connected across the input, the clamp circuitry comprises one of the first or second switches from the first series circuit and one of the third or fourth switches from the second series circuit, and power may be converted from an input voltage that may be less than or greater than the output voltage.

19. The apparatus of claim 18 wherein the controller is configured to adjust the reverse energy phase, and the amount of energy stored in the inductor at the end of the reverse energy phase, as a function of the amount of energy required to charge or discharge the second node capacitance to a voltage level to enable at least one of the third switch or the fourth switch to be turned on or off at substantially zero voltage.

20. The apparatus of claim 18 wherein the controller is configured to adjust the reverse energy phase, and the amount of energy stored in the inductor at the end of the reverse energy phase, as a function of the amount of energy required to charge or discharge the second node capacitance to a voltage level to enable both the third switch and the fourth switch to be turned on and off at substantially zero voltage.

21. The apparatus of claim 13 further comprising:

a secondary winding inductively coupled to the inductor and connected to the output, a clamp capacitor; and a second series circuit having third and fourth terminals configured to be connected across the clamp capacitor and a second central node for connection to a second end of the inductor, the second series circuit comprising a third switch connected between the third terminal and the second central node and a fourth switch connected between the fourth terminal and the second central node, the second central node being characterized by a second node capacitance; and wherein the first series circuit is configured to be connected across the input, the clamp circuitry comprises the first or second switches from the first series circuit and the third or fourth switches from the second series circuit, and the power conversion is via a transformer formed by the inductor and the secondary winding.

22. The apparatus of claim 21 wherein the controller is configured to adjust the reverse energy phase, and the amount of energy stored in the inductor at the end of the reverse energy phase, as a function of the amount of energy required to charge or discharge the second node capacitance to a voltage level to enable at least one of the third switch or the fourth switch to be turned on or off at substantially zero voltage.

23. The apparatus of claim 21 wherein the controller is configured to adjust the reverse energy phase, and the amount of energy stored in the inductor at the end of the reverse energy phase, as a function of the amount of energy required to charge or discharge the second node capacitance to a voltage level to enable both the third switch and the fourth switch to be turned on and off at substantially zero voltage.

24. The apparatus of claim 1 wherein the controller increases the duration of the reverse energy phase: (i) in a buck converter as the ratio of input voltage to output voltage increases beyond two; (ii) in a boost converter as the ratio of output voltage to input voltage falls below two; or (iii) in a buck-boost converter as the ratio of input voltage to output voltage increases beyond one; or (iv) in a double-clamped buck-boost converter as the ratio of input voltage to primary-reflected output voltage increases beyond one.

25. The apparatus of claim 1 wherein the controller minimizes the duration of the reverse energy phase: (i) in a buck converter if the ratio of input voltage to output voltage is less than two; (ii) in a boost converter if the ratio of output voltage to input voltage is greater than two; (iii) in a buck-boost converter if the ratio of input voltage to output voltage is less than one; or (iv) in a double-clamped buck-boost converter if the ratio of input voltage to primary-reflected output voltage is less than one.

26. The apparatus of claim 1 wherein the controller is configured to receive predetermined settings information and adjust the reverse energy phase in response to the predetermined settings information.

27. The apparatus of claim 1 wherein the controller is configured to sense operating conditions and make adjustments to the reverse energy phase based upon the sensed conditions.

28. The apparatus of claim 1 wherein the controller is configured to sense a voltage at the central node and to adjust the reverse energy phase as a function of the sensed voltage.

29. The apparatus of claim 1 wherein the controller is configured to adjust the reverse energy phase, and the amount of energy stored in the inductor at the end of the reverse energy phase, as a function of the amount of energy required to charge or discharge the node capacitance to a voltage level to enable at least one of the first switch or the second switch to be turned on or off at substantially zero voltage.

30. The apparatus of claim 1 wherein the controller is configured to adjust the reverse energy phase, and the amount of energy stored in the inductor at the end of the reverse energy phase, as a function of the amount of energy required to charge or discharge the node capacitance to a voltage level to enable both the first switch and the second switch to be turned on and off at substantially zero voltage.

31. A method for converting power received from an input source at an input voltage via an inductor for delivery to a load connected to an output at an output voltage including operating a plurality of switches in a series of converter operating cycles, including a freewheeling phase during which selected switches are conductive and a current flowing in the inductor is characterized by a first polarity and a magnitude which begins to decrease, the method comprising:
establishing a reverse energy phase, during which the selected switches are conductive and the current flowing in the inductor is characterized by a second polarity at the end of the reverse energy phase, the second polarity being opposite of the first polarity; and
establishing an energy recycling phase, during which the selected switches are OFF and energy stored in the inductor is used to charge or discharge a capacitance associated with a node to which the inductor is connected; and
adjusting the reverse energy phase, and the amount of energy stored in the inductor at the end of the reverse energy phase, as a function of the amount of energy required to charge or discharge the capacitance during the energy recycling phase.

32. The method of claim 31 further comprising:
establishing a clamp phase, during which clamp circuitry is enabled and the current flowing in the inductor is clamped to retain the second polarity.

33. The method of claim 31 wherein the adjusting comprises using predetermined setting information to program the duration of the reverse energy phase.

34. The method of claim 31 wherein the adjusting comprises sensing operating conditions and making adjustments to the reverse energy phase based upon the sensed operating conditions.

35. The method of claim 31 wherein the adjusting comprises sensing a voltage at the node and adjusting the reverse energy phase as a function of the sensed voltage.

36. The method of claim 31 wherein adjusting the reverse energy phase comprises adjusting the reverse energy phase, and the amount of energy stored in the inductor at the end of the reverse energy phase, as a function of the amount of energy required to charge or discharge the capacitance to a voltage level to enable at least one of the first switch or the second switch to be turned on or off at substantially zero voltage.

37. The method of claim 31 wherein adjusting the reverse energy phase comprises adjusting the reverse energy phase, and the amount of energy stored in the inductor at the end of the reverse energy phase, as a function of the amount of energy required to charge or discharge the capacitance to a voltage level to enable both the first switch and the second switch to be turned on and off at substantially zero voltage.

* * * * *

UNITED STATES PATENT AND TRADEMARK OFFICE
CERTIFICATE OF CORRECTION

PATENT NO. : 8,669,744 B1
APPLICATION NO. : 13/027830
DATED : March 11, 2014
INVENTOR(S) : Patrizio Vinciarelli It is certified that error appears in the above-identified patent and that said Letters Patent is hereby corrected as shown below:

In the Specification

Column 8, line 54, delete "V0" and insert -- Vo --

Column 10, line 17, delete "1660N" and insert -- 166 ON --

Signed and Sealed this
Twenty-fourth Day of June, 2014

Michelle K. Lee
*Deputy Director of the United States Patent and Trademark Office*